Figure 1:
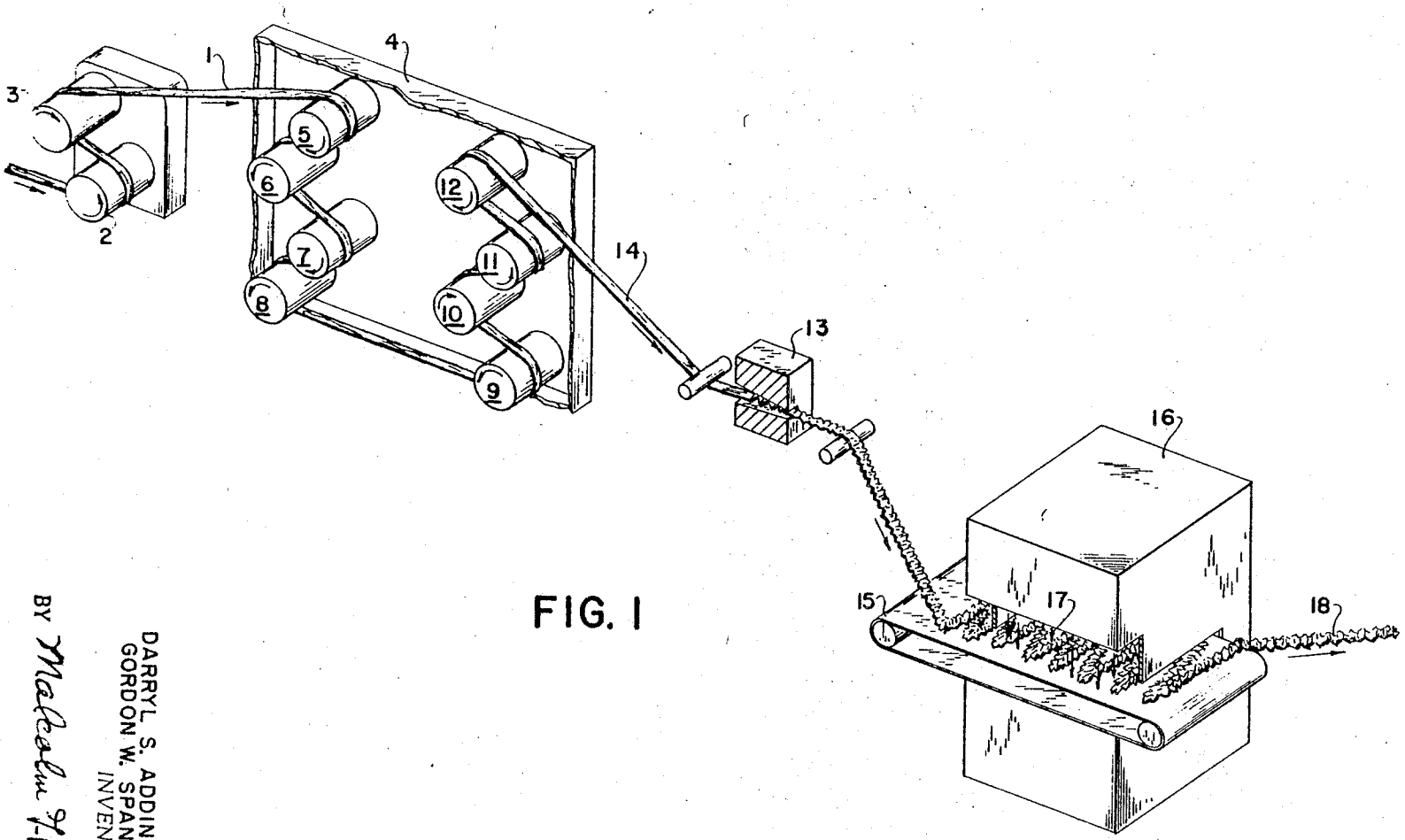

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 23, 1970

875 O.G. 383

T875,021
HIGH MODULUS POLYETHYLENE TEREPHTHALATE FIBERS

Darryl S. Addington, 182 Hillview, Memphis, Tenn. 38109, and Gordon W. Spangler, P.O. Box 511, Kingsport, Tenn. 37662

Filed Aug. 18, 1969, Ser. No. 855,071
Int. Cl. C08g *17/06;* D02j *1/22, 11/00*
U.S. Cl. 260—75
1 Sheet Drawing. 9 Pages Specification

High modulus polyethylene terephthalate staple fibers having a high degree of dimensional stability. The fibers are characterized by an ultimate tenacity greater than 5 grams/denier, an ultimate elongation less than 30%, a tenacity at 10% elongation greater than 3 grams/denier and a shrinkage in 190° C. air less than 4%. Dimensional stability is accomplished by subjecting the fiber to a 2 step heatsetting process whereby the fiber is first heatset at constant length and then in a tensionless state at a temperature between 110° C. and 160° C.

June 23, 1970 D. S. ADDINGTON ET AL T875,021

HIGH MODULUS POLYETHYLENE TEREPHTHALATE FIBERS

Filed Aug. 18, 1969

DARRYL S. ADDINGTON
GORDON W. SPANGLER
INVENTORS

BY Malcolm F. Dunn

ATTORNEY